United States Patent [19]

Abe

[11] Patent Number: 4,770,730
[45] Date of Patent: Sep. 13, 1988

[54] ULTRASONIC WELDING METHOD FOR SOFT ELASTIC FOAM BODY

[75] Inventor: Tadafumi Abe, Akishima, Japan

[73] Assignee: Tachi-S. Co., Ltd., Akishima, Japan

[21] Appl. No.: 102,336

[22] Filed: Sep. 29, 1987

[51] Int. Cl.[4] .................. B29C 65/08; B32B 31/20
[52] U.S. Cl. ..................... 156/73.1; 156/78; 156/312; 156/580.1; 264/23
[58] Field of Search .............. 156/73.1, 580.1, 580.2, 156/312, 78; 264/23

[56] References Cited

U.S. PATENT DOCUMENTS

| | | | |
|---|---|---|---|
| 3,170,832 | 2/1965 | Wilson et al. | 156/78 |
| 3,483,073 | 12/1969 | Pounder | 156/73.1 |
| 4,237,181 | 12/1980 | Tanabe et al. | 156/73.1 |
| 4,393,116 | 7/1983 | Taylor | 156/73.1 |
| 4,519,862 | 5/1985 | Urai et al. | 156/219 |
| 4,561,917 | 12/1985 | Urai | 156/73.1 |

FOREIGN PATENT DOCUMENTS 59-230590 12/1984 Japan .
59-230718 12/1984 Japan .

Primary Examiner—Michael Wityshyn
Attorney, Agent, or Firm—Oldham & Oldham Co.

[57] ABSTRACT

An ultrasonic welding method, in which a covering member is welded to a soft elastic foam body by means of ultrasound. There is employed an ultrasonic vibration horn having a great welding area, and such horn is pressed against a lamination of the covering member and soft elastic foam body at a predetermined or maximum degree of pressure, after which the pressure is reduced and under the reduced pressure, an ultrasonic vibration is applied to the lamination. Thereafter, the horn is pressed once again against the lamination at the same predetermined or maximum degree of pressure, whereby the covering member is welded to the soft elastic foam body.

4 Claims, 2 Drawing Sheets

ULTRASONIC WELDING METHOD FOR SOFT ELASTIC FOAM BODY

BACKGROUND OF THE INVENTION

1. Field of the Invention

The present invention relates to a method of welding an automotive seat covering member to a soft elastic foam body by means of an ultrasound, and in particular to an ultrasonic welding method in which a thermoplastic covering member is welded integrally to the surface of the soft elastic foam body, using an ultrasonic vibration horn having a great welding area.

2. Description of Prior art

In the past, it has been generally thought that a soft elastic foam body, such as urethane foam, will never be welded to a covering member by means of ultrasonic welding method, because the foam body absorbs the vibration of an ultrasonic vibration horn used, resulting in hindering the welding operation.

An attempt has been made to solve this problem, proposing a new ultrasonic welding method as disclosed in various Japanese publications, for example, the Japanese Laid-Open Patent Publication Nos. 59-230590 and 59-230718. According to these previous inventions, a covering member is welded by ultrasound to a foam cushion body comprising a foam material and slab to provide an automotive seat or trim cover assembly.

However, those prior arts utilize an ultrasonic vibration horn of a small welding area, and involve the steps of applying a predetermined or maximum degree of pressure to the foam body, and at the same time, applying an ultrasonic vibration to the foam body at a given period, and then repeating such ultrasonic vibration steps, so as to weld the covering member to the foam body. The drawback is that while the small welding area of the horn enables a uniform welding to be achieved, yet the use of a horn having a greater area, such as approx. 100 mm² area, will cause a poor welding (non-uniform welding) between the covering member and foam body, by the reason that such great welding area becomes too much to retain a uniform pressure application against those covering member and foam body, and thus, the ultrasonic vibration under non-uniform pressure is not applied uniformally thereto. Further, as another drawback, when pressure is applied, the foam body becomes high in resilience force against the ultrasonic vibration horn, and therefore the horn is not vibrated well.

Still other disadvantages are found: (1) Since the welding conditions vary according to a different fixed degree of pressure for each different foam body and some non-uniform foam sites within the foam body leads to further difficulty in the welding conditions, it is then extremely difficult to set an optimum condition for effecting a positive welding, and (2) in the above conventional ultrasonic welding, it has been found that a frictional heat caused at the welding surface of the ultrasonic vibration horn is applied to the covering member, which frequently melts the covering member and the melt is adhered to the welding surface of the horn, with the result that the welded element as a whole can not be removed easily or completely from the horn.

SUMMARY OF THE INVENTION

It is a primary purpose of the present invention to provide an ultrasonic welding method for soft elastic foam body, by which a thermoplastic covering member can be positively welded to the soft elastic foam body, using an ultrasonic vibration horn having a great welding area.

In accomplishing the above purpose, in accordance with the present invention, there are provided the steps of:

(a) applying a predetermined or maximum degree of pressure to both covering member and soft elastic foam body;

(b) thereafter, reducing such degree of pressure and, under the reduced pressure, applying an ultrasonic vibration via an ultrasonic vibration horn having a great welding area to those two elements; and (c) at the completion of such vibration, increasing the reduced pressure up to the foregoing fixed or predetermined degree of pressure.

Accordingly, it will be observed that the pressure being reduced at the step (b) above becomes a uniform pressure given evenly to the entire welding portion of the covering member and foam body in cooperation with the elastic recovery of the foam body which acts against the pressure. This permits ensuring to apply a uniform ultrasonic vibration to those two elements for an even welding.

It is another purpose of the present invention to provide an ultrasonic welding method which permits easy removal of an ultrasonic vibration horn from the first layer of the two layer body which includes a foam body as the second layer below the first layer, and also allows a shortened time of welding.

To this end, the ultrasonic vibration horn used in the present invention is at its welding surface provided with an element having a high heat insulation and wear resistance (for example, polytetrafluoroethylene known as Teflon). Thus, during the welding process, when heat is created in the first layer of the two layer body due to the ultrasonic vibration applied, such insulation element reduces the heat conductivity of the heat to the ultrasonic vibration horn. Accordingly, since a heat is prevented from being transmitted to the horn and retained in the welding portion, the welding time is effectively shortened, and since there is no creation of heat between the welding surface of the horn and the first layer, the horn can be removed from the first layer with much ease and completely.

DETAILED DESCRIPTION OF PREFERRED EMBODIMENTS OF THE INVENTION

Figure 1:
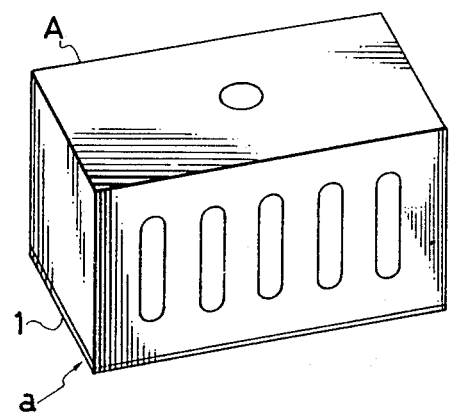
FIG. 1 is a perspective view of an ultrasonic vibration horn of an ultrasonic welding apparatus in accordance with the present invention.

Referring to FIG. 1, designation (A) refers to an ultrasonic vibration horn of an ultrasonic welding apparatus. The ultrasonic vibration horn (A) is of a conventional one of a so-called "bar-horn" type and made of an aluminium alloy (Al,Co,U,Mg2). At the bottom surface of the horn (A), there is defined a contact surface (a), whose entire area is provided with an insulating member (a) having a high heat insulation and wear resistance.

In accordance with the present invention, the contact surface (a) is of a great area as noted above.

Preferably, the insulating member (1) is treated with a polytetrafluoroethylene known as Teflon. (20-100 micron layer of Teflon resin is desirable for such treatment.)

Figure 2:
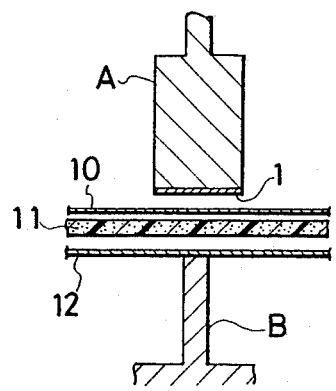
FIG. 2 is a sectional view which explanatorily shows the steps of the present invention.

Now, with reference to FIG. 2, the steps of the present invention method will be described.

Although not shown, the ultrasonic welding apparatus used in the present invention comprises an ultrasound generator, an amplitude control device and an ultrasonic vibration horn, in a conventional manner.

In the present embodiment, an element to be welded comprises a covering member of a polyester material (12), a foam wadding (11) (i.e. slab material of urethane foam) and a wadding cover (10) of nylon material.

The ultrasonic vibration horn (A) is adapted to weld together the above-mentioned three-layer member in a rectilinear manner.

Firstly, the wadding cover (10), foam wadding (11) and wadding cover (12) are placed on the lower lower support member (B) of the ultrasonic welding apparatus.

Then, the ultrasonic vibration horn (A) is lowered and pressed against such lamination at a predetermined degree of pressure. Depending on the sort of foam wadding and wadding cover to be used, the pressure may be adjusted at a predetermined limited degree or a maximum degree.

The horn (A) is raised so as to reduce the pressure against the lamination down to such a degree that the horn (A) is in a slight contact with the covering member (12), or down to a relatively lower degree than the aforementioned predetermined degree degree (or maximum degree).

After the reduction of the pressure has been completed, the ultrasound generator is energized to bring the ultrasonic vibration horn (A) to a vibrating operation, so as to cause a vibrating frictional heat between the covering member (12) and foam wadding (11), as well as between the foam wadding (11) and wadding cover (12), so that the lower surface of the covering member and both upper and lower surfaces of the wadding (11) are melted to a state ready for welding.

Thereafter, the ulrasonic vibration horn (A) is lowered and pressed against such lamination (10,11, 12), again, at the foregoing predetermined (or maximum) degree of pressure, whereupon the lamination is welded together.

The above-described series of steps are repeated in order to complete the welding.

As regards the specific conditions for effecting the above-mentioned processes, one of the preferred examples will be given as below, by referring to FIGS. 1 and 2. It should be noted that all designations to be used below correspond to all ones in the FIGS. 1 and 2.

(a) A Subject to be Welded

A three-layer lamination composed of the following elements in order:

(i) a covering member (10) made of polyester material.
(ii) a foam wadding (11) made of urethane foam with 10 mm thickness, 0.25 specific gravity and 10 kg hardness. Note: the 10 kg hardness is determined under the Japanese Industrial Standard.
(iii) a wadding cover (12) made of nylon material.

(b) An Ultrasonic Welding Apparatus (i) an ultrasound generator section (not shown) with 10 khz frequency, 76 amplitude and its required cooling time being 1.5-2.0 seconds.
(ii) an ultrasnic vibration horn (A) of "bar-horn" type with 80 mm width and 300 mm length and having 1200 mm$^2$ welding area.
(iii) a lower support member (B) on which an element to be welded is placed.

(c) Welding Steps (i) The three-layer lamination (10,11,12) noted in (a) above is placed on the lower support member (B).
(ii) Then, the ultrasonic vibration horn is lowered and pressed against the lamination at the pressure of 345 kg.
(iii) Thereafter, the horn is raised so as to reduce the pressure down to a relatively lower degree than 345 kg.
(iv) The ultrasound generator section (not shown) of the ultrasonic welding apparatus is programmed at 0.9-1.2 seconds for ultrasound emitting time and 70%-80% for output loading factor of the generator under percentage, and is energized to bring the ultrasonic vibration horn (A) to a vibrating operation, so that the lamination (10,11,12) is welded together.
(v) The above-described sequences of steps are repeated in order to complete the welding.

It should be understood that the aforementioned 10 kg hardness is determined on the basis of the undermentioned test procedures:

(a) From a material to be tested, a sample strip of 48-55 mm thickness and having such area enough to encircle the circle of approx. 30 cm diameter is collected.

(b) Such sample strip is placed on a table of a testing apparatus, and then a circle-shaped pressure plate of the testing apparatus whose diameter is 200.0±0.1 mm is brought to contact with the upper surface of the sample strip and a load of 0.5 kgf(4.9N) is applied through the pressure plate to the sample strip Then, the thickness of thus-pressed sample strip is measured as an initial thickness. Next, the circle-shaped pressure plate is pressed into the sample strip at the rate of not more than 10 mm/s to such a degree that the pressure plate is sunk in the sample strip down to the level of 75% of the initial thickness. Immediately thereafter, the load is released, and the pressure plate is at once pressed into the same strip once again at the rate of not more than 10 mm/s, down to the level of 25% of the initial thickness, and stopped as it is. At 20 seconds after such stopped state, the amount of the load applied is read at the unit of as small as 0.1 kgf(0.98N) and determined as a hardness of the material in question. The present test is carried out one time, and the result amount obtained shall be indicated at an integral number.

Now, it is important to note that, when the same ultrasonic vibration horn (A) is used and the pressure thereof against the lamination (10,11,12) is set at 420 Kg, the ultrasound emitting time is reduced down to 0.7-0.9 seconds. Hence, it is seen that increasing the pressure of the horn (A) against the lamination reduces the ultrasound emitting time thereby expediting the welding process. In other words, application of the Teflon resin to the contact surface (a) of the horn (A) advantageously reduces the ultrasound emitting time.

Energizing the generator section and cooling thereof are controlled by a timer.

From the above description, it will be appreciated that since the ultrasonic vibration horn is firstly pressed against the lamination (10,11,12) at a predetermined degree of pressure, and then raised so as to reduce the pressure, the ultrasonic vibration being given by the horn (A) at such reduced pressure state can be uniformly and positively transmitted to the lamination (10,11,12), because the elastic recovery of the foam wadding (11) serves to press the top surface of the lamination to the contact surface (a) of the horn (A) in a uniform manner, which ensures to weld together the lamination (10,11,12) uniformly, avoiding non-welded portions therein.

Further, it will be appreciated that the pressure can be kept at a predetermined degree while the ultrasonic welding is being effected, except that several greatly different welding areas of the ultrasonic vibration horns are used, and therefore, only the requirement for setting a certain conditions for the ultrasonic welding process is dependent on the setting of welding time, thereby contributing to the improvement of the welding process.

In the above-discussed embodiments, the ultrasonic welding is effected to a mere layer shape of foam body, but may be effected to an uneven shape of foam body formed by a mold.

The description above has just been given of preferred embodiments of the present invention, but it should be understood that the invention is not limited to the embodiments illustrated but various other replacements, modifications and additions may structurally be possible without departing from the scope and spirit of the appended claims for the invention.

What is claimed is:

1. An ultrasonic welding method comprising the steps of:
   placing a thermoplastic covering member on a soft elastic foam body to form an assembly;
   applying a pressure to said assembly of said covering member and foam body at a predetermined or maximum degree of pressure;
   thereafter, lowering said degree of pressure;
   then, applying an ultrasonic vibration to said assembly; and
   then, at completion of said ultrasonic vibration, applying pressure to said assembly at said predetermined or maximum degree of pressure, whereby said covering member is welded to said foam body thereby forming a lamination.

2. The method as defined in claim 1, wherein as means for applying said ultrasonic vibration, utilized is an ultrasonic vibration horn having a welding area of at least 100 mm$^2$.

3. The method as defined in claim 2, wherein a welding surface of said ultrasonic vibration horn is provided with an element having a high heat insulation and wear resistance.

4. The method as defined in claim 3, wherein said element is treated with polytetrafluoroethylene resin.

* * * * *